E. A. MARX.
COMBINATION INSTRUMENT.
APPLICATION FILED OCT. 1, 1913.

1,118,873.

Patented Nov. 24, 1914.

Witnesses
Geo. E. Fuch.
Dudley B. Howard.

Inventor
Emil A. Marx.
By Victor J. Evans
Attorney

UNITED STATES PATENT OFFICE.

EMIL A. MARX, OF ROYAL CENTER, INDIANA.

COMBINATION INSTRUMENT.

1,118,873.  Specification of Letters Patent.  Patented Nov. 24, 1914.

Application filed October 1, 1913. Serial No. 792,831.

*To all whom it may concern:*

Be it known that I, EMIL A. MARX, a citizen of the United States, residing at Royal Center, in the county of Cass and State of Indiana, have invented new and useful Improvements in Combination Instruments, of which the following is a specification.

This invention relates to a combination square, level, and gage, the primary object being to provide a device of this character wherein the elements mentioned coöperate with each other in such a manner that a number of different operations may be performed by these three elements alone in an efficient and accurate manner.

A further object of the invention is to provide a combination device of the class described which includes a level stock having a pair of spirit tubes mounted thereon so as to be disposed at right angles to each other and in a common plane, together with a movable arm pivoted to one end of the level stock and provided with a linear scale, it being adapted to be adjusted angularly with respect to the longitudinal axis of the said stock for rendering the device useful as a square, the said arm being adapted to be folded inwardly against a limiting surface which maintains the same parallel to the axis of the said stock. A longitudinally adjustable gage device is also mounted within the stock for movement in the plane of the spirit tubes and parallel to the said arm, when in its innermost position whereby the scale upon the arm may be used in determining the linear adjustment of the gage device.

A still further object is the provision of a combination device whose elements are simple in construction and are arranged in a neat and compact manner whereby the device is rendered inexpensive in the cost of manufacture, durable, and easy to operate.

Figure 1:
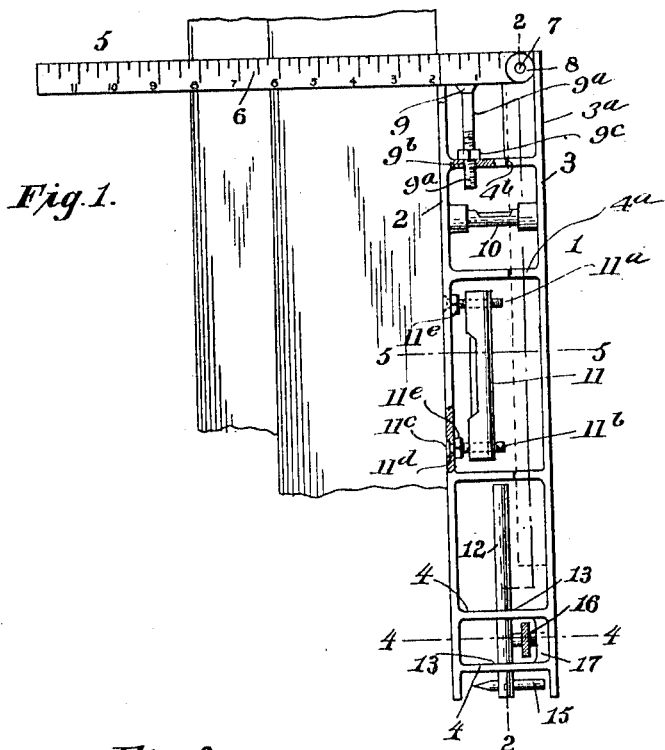
Figure 2:
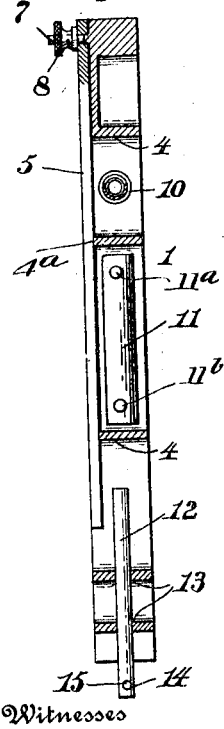
Figure 3:
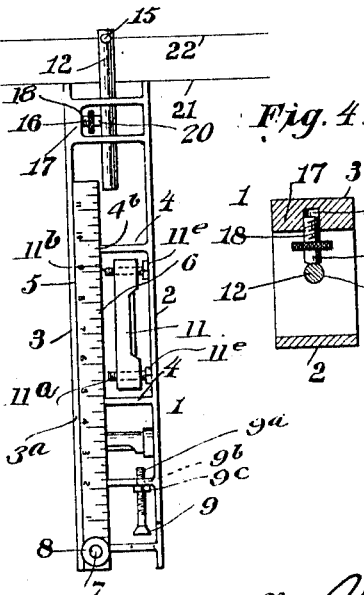
Figure 4:
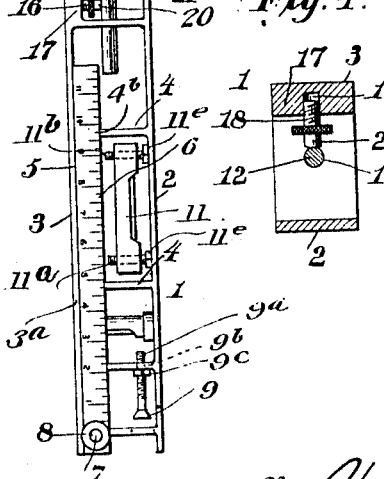
Figure 5:
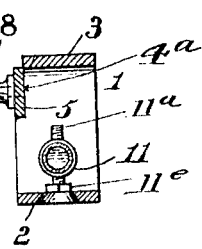

The invention consists in the features of construction, combination, and arrangement of parts, hereinafter fully described and claimed, reference being had to the accompanying drawing, in which:

Figure 1 is a side elevation of the device, showing the movable arm extended at right angles to the level stock for use in marking off a timber; Fig. 2 is a longitudinal sectional view on line 2—2 of Fig. 1; Fig. 3 is a side elevation, showing the movable arm folded inwardly for use in conjunction with the gage device, the latter being shown in use in inscribing a horizontal line parallel to another horizontal line; Fig. 4 is a transverse sectional view on line 4—4 of Fig. 1; and, Fig. 5 is a similar view on line 5—5 of the same figure.

In the drawing, the numeral 1 designates the elongated rectangular stock of the device, which is preferably constructed of some light and durable metal, and which includes the parallel side members 2 and 3 and the connecting cross members 4. A movable arm 5, which is graduated so as to provide the linear scales 6 extending longitudinally thereon, is pivoted to one end of the stock by means of the pivot bolt 7, which latter is provided with a clamping head 8 by which the movable arm may be secured in different angularly adjusted positions with respect to the stock. The stock 1 has one side edge of its side member 3 and adjacent edges of certain cross members 4 cut away as at 3ᵃ and 4ᵃ respectively in order that the arm 5 may swing inwardly against the shoulders 4ᵇ which are provided upon the said members 4. These shoulders are disposed in true longitudinal alinement, whereby they will maintain the arm 5 parallel to the longitudinal axis of the stock when the said arm is folded inwardly and engages the said shoulders evenly, for a purpose which will be described more fully hereinafter. The cross member 4 of the stock nearest to the pivot bolt 7 is also cut away together with the edge of the side member 2 in order that the movable arm may be swung around into a position substantially at right angles to the longitudinal axis of the stock and consequently the outer active faces of the side members 2 and 3. In this position, which is shown particularly in Fig. 1 of the drawing, the arm 5 is adapted to engage the head 9 of a longitudinally adjustable limiting member 9ᵃ, which latter has its inner end portion threaded within an opening 9ᵇ provided in the first cross portion 4 of the stock from the end to which the said arm is pivoted. The limiting member just described is provided in order that wear in the movable arm pivot may be allowed for whenever necessary so that the said arm will be disposed at exactly ninety degrees to the longitudinal axis of the stock when it is secured in engagement with the head of the limiting member by means of the clamping head 8. A lock nut 9ᶜ is threaded onto the limiting member for engagement with the cross member of the stock in which the said limiting member is mounted. This lock nut serves as means for securing the limiting member effectively in its different adjusted positions.

A spirit tube 10 is mounted within the stock so as to extend at right angles to its side members 2 and 3, and a second spirit tube 11 is mounted upon the inner face of the side member 2 in such a manner that it is disposed parallel to the longitudinal axis of the stock and in the plane of the tube 10. The tube 11 is connected with the side member 2 of the stock by means of the adjustable screw members 11$^a$ and 11$^b$, which are threaded into lateral openings in the opposite ends of the body of the tube and whose adjusting heads 11$^c$ are swiveled in the openings 11$^d$ provided in the said side member of the stock. Upon adjustment of these screw members, the tube may be adjusted angularly with respect to the stock whereupon the tube may be secured against further angular movement by tightening the lock nuts 11$^e$ which are threaded onto the respective screw members for engagement with the inner face of the stock member 2. The last-named spirit tube may be used in leveling horizontal surfaces, whereas the tube 10 is intended primarily for use in plumbing vertical surfaces.

A cylindrical gage bar 12 is mounted for longitudinal slidable movement within alining openings 13 provided in the pair of cross members 4 disposed at the end of the stock opposite to the end to which the movable arm 5 is connected. The bar 12 is provided in its outer end with a transverse opening 14 in which a pencil 15 or other marking instrument may be mounted. A thumb screw 16 is disposed between the gage bar and a boss 17 provided upon the inner face of the stock member 3 between the particular cross members 13 just referred to, with its outer threaded end 18 engaged within a threaded opening 19 in the said boss. The inner end 20 of the said screw is adapted for engagement with the gage bar, so that the latter may be locked in its different longitudinally adjusted positions by manipulation of the thumb screw in a manner which should be readily understood.

As shown particularly in Figs. 1 and 2, the movable arm 5 may be extended into a position at right angles to the stock of the level for use in marking off a timber in addition to the use of the stock as a level and plumb device. In Fig. 3, the device is shown in use in inscribing a horizontal line parallel to a horizontal line. Prior to performing this latter operation, the movable arm 5 is folded inwardly against the limiting shoulders 4$^b$ and is secured therein by the clamping nut 8. Then, by loosening the thumb screw 16 and adjusting the gage bar 12 longitudinally with reference to the scale provided upon the arm 5, the said gage bar may be set in such a position that the marking instrument 15 will be disposed at the desired distance from the opposite end of the stock 1, whereupon the bar 12 may be secured in this position by means of the thumb screw. After this preparation has been made, the stock of the level may be positioned with adjacent side edges of the members 2 and 3 in even engagement with the wall, or other vertical surfaces upon which the line is to be inscribed, it being understood that the gage bar has been turned previously so that the marking instrument will project inwardly toward the said surface. The upper end of the stock is brought into registration with the line already inscribed, such as that indicated by the numeral 21 and the stock is moved horizontally along the said vertical surface and is maintained in a vertical position by reference to the spirit tube 10, while the marking point of the instrument 15 is drawn along the said surface so as to trace a line 22 thereon, which will be parallel to the first-named line.

From the foregoing description, taken in connection with the accompanying drawing, it should be apparent that I have provided a simply constructed combination instrument which comprises few parts, the same being arranged so that they are combined for use in performing a number of operations in a convenient and accurate manner which are ordinarily performed by a greater number of implements. I desire to have it understood, however, that I may resort to minor changes in the details of construction, falling within the scope of the appended claims, as may be deemed necessary in practice.

Having thus described my invention, what I claim is:

1. An instrument of the class described comprising an elongated rectangular stock, a movable arm pivoted to one end of the stock and adapted to be extended laterally therefrom or to be folded into the stock, means for limiting the inward movement of the said arm to maintain the same in a position parallel to the longitudinal axis of the stock, the said movable arm being provided with a linear scale, a longitudinally adjustable gage bar mounted within the stock and adapted for movement longitudinally with respect to the movable arm when in its innermost position, the said gage bar being adapted to extend parallel to the movable arm for coöperation with its scale when the said arm is in its folded position and being provided with a transverse opening, and a marking instrument adapted to be mounted within said opening.

2. An instrument of the class described comprising an elongated rectangular stock, a movable arm pivoted to one end of the stock and adapted to be extended laterally therefrom or to be folded into the stock, means for limiting the inward movement of the said arm to maintain the same in a position parallel to the longitudinal axis of the stock, the said movable arm being provided with a linear scale, a longitudinally adjustable gage bar mounted within the stock and adapted for movement longitudinally with respect to the movable arm when in its innermost position, the said gage bar being adapted to extend parallel to the movable arm for coöperation with its scale when the said arm is in its folded position and being provided with a transverse opening, a marking instrument adapted to be mounted within the said opening, and means by which the gage bar may be secured in its different adjusted positions.

3. An instrument of the class described comprising an elongated rectangular stock, a movable arm pivoted to one end of the stock and adapted to be extended laterally therefrom or to be folded into the stock, means for limiting the inward movement of the said arm to maintain the same in a position parallel to the longitudinal axis of the stock, the said movable arm being provided with a linear scale, a longitudinally adjustable gage bar slidably and rotatably mounted within the stock and adapted for movement longitudinally with respect to the movable arm when in its innermost position, the said gage bar being adapted to extend parallel to the movable arm for coöperation with its scale when the said arm is in its folded position and being provided with a transverse opening, a marking instrument adapted to be mounted within the said opening, and means by which the gage bar may be secured in its different adjusted positions.

In testimony whereof I affix my signature in presence of two witnesses.

EMIL A. MARX.

Witnesses:
R. G. HOLLIS,
W. H. LUTES.

Copies of this patent may be obtained for five cents each, by addressing the "Commissioner of Patents, Washington, D. C."